(12) United States Patent
Chyan

(10) Patent No.: US 8,910,310 B2
(45) Date of Patent: Dec. 9, 2014

(54) EMBEDDED FLASH MEMORY CARD AND ELECTRONIC DEVICE USING THE SAME, AND ENGINEERING BOARD FOR EMBEDDED FLASH MEMORY CARD

(71) Applicant: Silicon Motion, Inc., Jhubei, Hsinchu County (TW)

(72) Inventor: Yu-Wei Chyan, Hsinchu (TW)

(73) Assignee: Silicon Motion, Inc., Jhubei, Hsinchu County (TW)

( * ) Notice: Subject to any disclaimer, the term of this patent is extended or adjusted under 35 U.S.C. 154(b) by 18 days.

(21) Appl. No.: 13/760,328

(22) Filed: Feb. 6, 2013

(65) Prior Publication Data
US 2013/0312123 A1 Nov. 21, 2013

Related U.S. Application Data

(60) Provisional application No. 61/648,558, filed on May 17, 2012.

(51) Int. Cl.
*G06F 21/79* (2013.01)
*G06F 21/70* (2013.01)
*G06F 21/78* (2013.01)

(52) U.S. Cl.
CPC ............... *G06F 21/70* (2013.01); *G06F 21/78* (2013.01)
USPC .............................. 726/34; 711/152; 257/738

(58) Field of Classification Search
CPC .................................. G06F 21/75; G06F 21/79
USPC ................ 711/103; 257/737, 738; 726/34, 36
See application file for complete search history.

(56) References Cited

U.S. PATENT DOCUMENTS

| | | | | |
|---|---|---|---|---|
| 5,334,857 | A * | 8/1994 | Mennitt et al. | 257/48 |
| 6,075,255 | A * | 6/2000 | Liao et al. | 257/48 |
| 6,831,294 | B1 * | 12/2004 | Nishimura et al. | 257/48 |
| 7,185,145 | B2 * | 2/2007 | Mizushima et al. | 711/115 |
| 7,350,023 | B2 * | 3/2008 | Mizushima et al. | 711/115 |
| 7,635,269 | B2 * | 12/2009 | Oda | 439/71 |
| 7,694,067 | B2 * | 4/2010 | Mizushima et al. | 711/103 |
| 7,855,441 | B2 * | 12/2010 | Han | 257/678 |
| 7,899,967 | B2 * | 3/2011 | Chi et al. | 710/301 |
| 8,103,817 | B2 * | 1/2012 | Chi et al. | 710/301 |
| 8,108,692 | B1 * | 1/2012 | Merry et al. | 713/193 |
| 2004/0177215 | A1 * | 9/2004 | Nagamasa et al. | 711/103 |
| 2004/0232446 | A1 * | 11/2004 | Nishimura et al. | 257/202 |
| 2007/0022222 | A1 * | 1/2007 | Wu et al. | 710/13 |
| 2007/0088906 | A1 * | 4/2007 | Mizushima et al. | 711/103 |
| 2008/0173996 | A1 * | 7/2008 | Han | 257/679 |
| 2009/0013125 | A1 * | 1/2009 | Mizushima et al. | 711/103 |

(Continued)

*Primary Examiner* — Darren B Schwartz
*Assistant Examiner* — J. Brant Murphy
(74) *Attorney, Agent, or Firm* — McClure, Qualey & Rodack, LLP

(57) ABSTRACT

An embedded MultiMediaCard (eMMC), an electronic device equipped with an eMMC and an eMMC engineering board are disclosed. The eMMC includes an eMMC substrate plate, a plurality of solder balls and an eMMC chip. The solder balls are soldered to the eMMC substrate plate, and, one of the solder balls is designed as a security protection enable/disable solder ball. The eMMC chip is bound to the eMMC substrate plate, and, the eMMC chip has a security protection enable/disable pin electrically connected to the security protection enable/disable solder ball. The security protection enable/disable pin is internally pulled high by the eMMC chip when the security protection enable/disable solder ball is floating. When the security protection enable/disable solder ball is coupled to ground, the eMMC is protected from software-based attacks.

6 Claims, 3 Drawing Sheets

(56) References Cited

U.S. PATENT DOCUMENTS

| | | | |
|---|---|---|---|
| 2009/0121551 A1* | 5/2009 | Lee | 307/66 |
| 2009/0283600 A1* | 11/2009 | Chang et al. | 235/441 |
| 2009/0327565 A1* | 12/2009 | Ware | 710/305 |
| 2010/0096752 A1* | 4/2010 | Ri | 257/738 |
| 2010/0131707 A1* | 5/2010 | Chi et al. | 711/115 |
| 2010/0312933 A1* | 12/2010 | Chou et al. | 710/106 |
| 2011/0113212 A1* | 5/2011 | Chi et al. | 711/163 |
| 2011/0211403 A1* | 9/2011 | Ware | 365/191 |
| 2012/0063190 A1* | 3/2012 | Koh | 365/51 |

* cited by examiner

EMBEDDED FLASH MEMORY CARD AND ELECTRONIC DEVICE USING THE SAME, AND ENGINEERING BOARD FOR EMBEDDED FLASH MEMORY CARD

CROSS REFERENCE TO RELATED APPLICATIONS

This application claims the benefit of U.S. Provisional Application No. 61/648,558 filed on May 17, 2012, the entirety of which is incorporated by reference herein.

BACKGROUND OF THE INVENTION

1. Field of the Invention

The present invention relates to an embedded MultiMediaCard (eMMC), an electronic device equipped with an eMMC and an eMMC engineering board.

2. Description of the Related Art

A MultiMediaCard (MMC) is a flash memory card standard. An Embedded MultiMediaCard (eMMC) is an architecture having an embedded storage solution with an MMC interface, flash memory and controller, all packaged together.

Today, eMMC is commonly used in mobile devices (such as a mobile phone) for data storage. However, via vendor commands designed in eMMCs for failure analysis, malicious hackers may gain access to the eMMC for security data.

Thus, protecting the eMMC of a mobile device from malicious software-based attacks is an important issue.

BRIEF SUMMARY OF THE INVENTION

An embedded MultiMediaCard (eMMC), an electronic device equipped with an eMMC and an eMMC engineering board are disclosed.

An eMMC in accordance with an exemplary embodiment of the invention comprises an eMMC substrate plate and a plurality of solder balls and an eMMC chip. The solder balls are soldered to the eMMC substrate plate, and, one of the solder balls is designed as a security protection enable/disable solder ball. The eMMC chip is bound to the eMMC substrate plate and has a security protection enable/disable pin electrically connected to the security protection enable/disable solder ball. The security protection enable/disable pin is internally pulled high by the eMMC chip when the security protection enable/disable solder ball is floating. When the security protection enable/disable solder ball is coupled to ground, the eMMC is protected from software-based attacks.

In an exemplary embodiment the eMMC chip has a controller having a read only memory stored with a ROM code. The controller executes the ROM code to determine a voltage level of the security protection enable/disable pin. When the security protection enable/disable pin is pulled low, the controller executing the ROM code enables a security protection of the embedded MultiMediaCard; otherwise, the controller disables the security protection. In an exemplary embodiment, the controller may enable the security protection by disabling a plurality of vendor commands which are designed for failure analysis of the eMMC.

An electronic device in accordance with an exemplary embodiment of the invention comprises the aforementioned eMMC and a printed circuit board. The eMMC is soldered to the printed circuit board via the solder balls of the eMMC, and, the security protection enable/disable solder ball of the eMMC is soldered to a ground line of the printed circuit board. Thus, the security protection of the eMMC of the electronic device is enabled.

In another exemplary embodiment, an eMMC engineering board is disclosed, which comprises an eMMC socket and a printed circuit board. The eMMC socket is designed for insertion of the aforementioned eMMC and is mounted onto the printed circuit board. The printed circuit board provides contact pads to contact with just a portion of the solder balls of the inserted eMMC and leaves the security protection enable/disable solder ball floating. Thus, the security protection of the eMMC inserted in the eMMC socket is disabled and failure analysis of the eMMC is allowed.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several exemplary embodiments carrying out the invention. This description is made for the purpose of illustrating the general principles of the invention and should not be taken in a limiting sense. The scope of the invention is best determined by reference to the appended claims.

Figure 1:
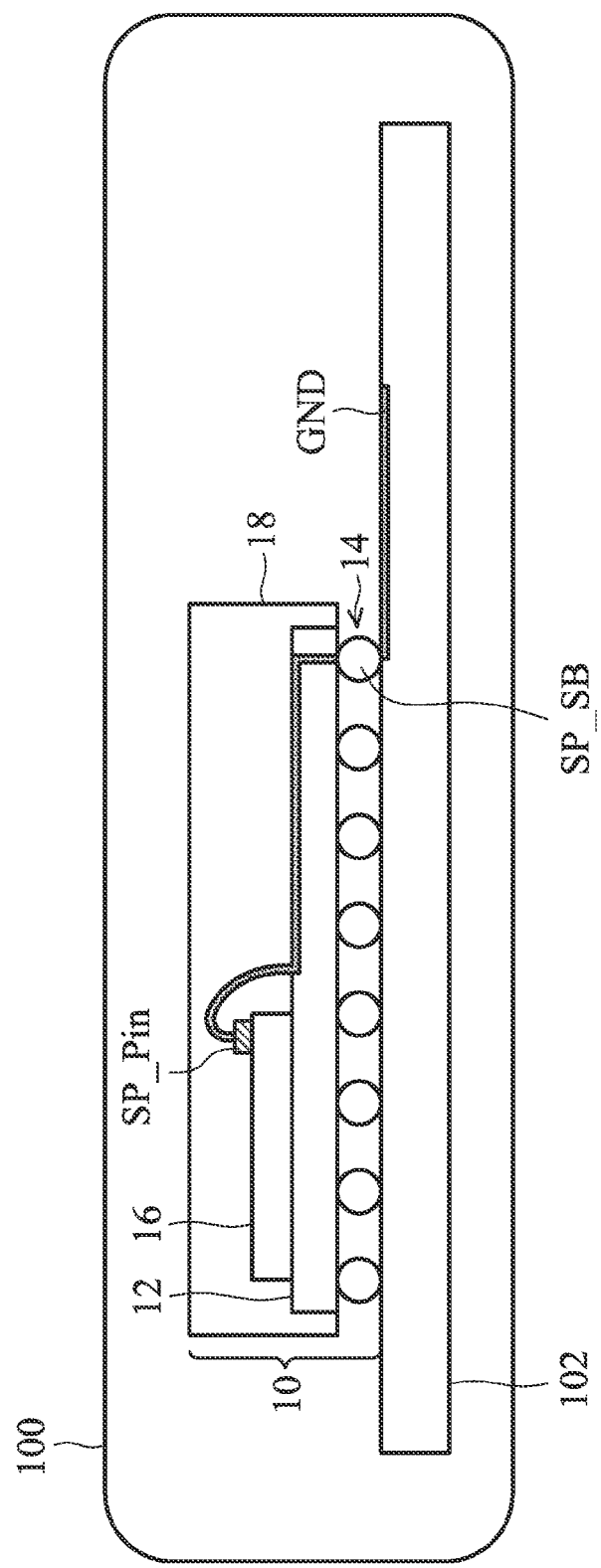
FIG. 1 depicts an electronic device 100 in accordance with an exemplary embodiment of the invention, which is a lateral view of the electronic device 100, showing how an embedded MultiMediaCard (eMMC) 10 is mounted onto a printed circuit board 102 and showing the internal design of the eMMC 10.

FIG. 1 depicts an electronic device 100 in accordance with an exemplary embodiment of the invention, which is a lateral view of the electronic device 100, showing how an embedded MultiMediaCard (eMMC) 10 is mounted onto a printed circuit board 102 and showing the internal design of the eMMC 10.

As shown, the eMMC 10 comprises an eMMC substrate plate 12 and a plurality of solder balls 14 and an eMMC chip 16 and is packaged by an eMMC package 18. The solder balls 14 are soldered to the eMMC substrate plate 12. One of the solder balls 14 is designed as a security protection enable/disable solder ball and labeled SP_SB. The eMMC chip 16 is bound to the eMMC substrate plate 12. Further, the eMMC chip 16 has a security protection enable/disable pin SP_Pin electrically connected (for example, through a bounding wire or a conductive trace) to the security protection enable/disable solder ball SP_SB. The security protection enable/disable pin SP_Pin is internally pulled high by the eMMC chip 16 (e.g., through an internal pull high resistor within the eMMC chip 16) when the security protection enable/disable solder ball SP_SB is floating. Further, as shown in FIG. 1, when the eMMC 10 is soldered onto the printed circuit board 102 via the solder balls 14 to work as a data storage device of the electronic device 100, the security protection enable/disable solder ball SP_SB is particularly soldered to a ground line GND of the printed circuit board 102 to pull down the voltage level of the security protection enable/disable pin SP_Pin. Thus, the determination of whether a security protection of the eMMC 10 is required depends on the status of the security protection enable/disable solder ball SP_SB. According to the disclosure, the eMMC 10 is protected from software-based attacks when it is determined that the security protection enable/disable solder ball SP_SB is coupled to ground (which shows that the eMMC 10 is equipped in the electronic device 100 for data storage and a security protection for the data stored in the eMMC 10 is required).

Figure 2:
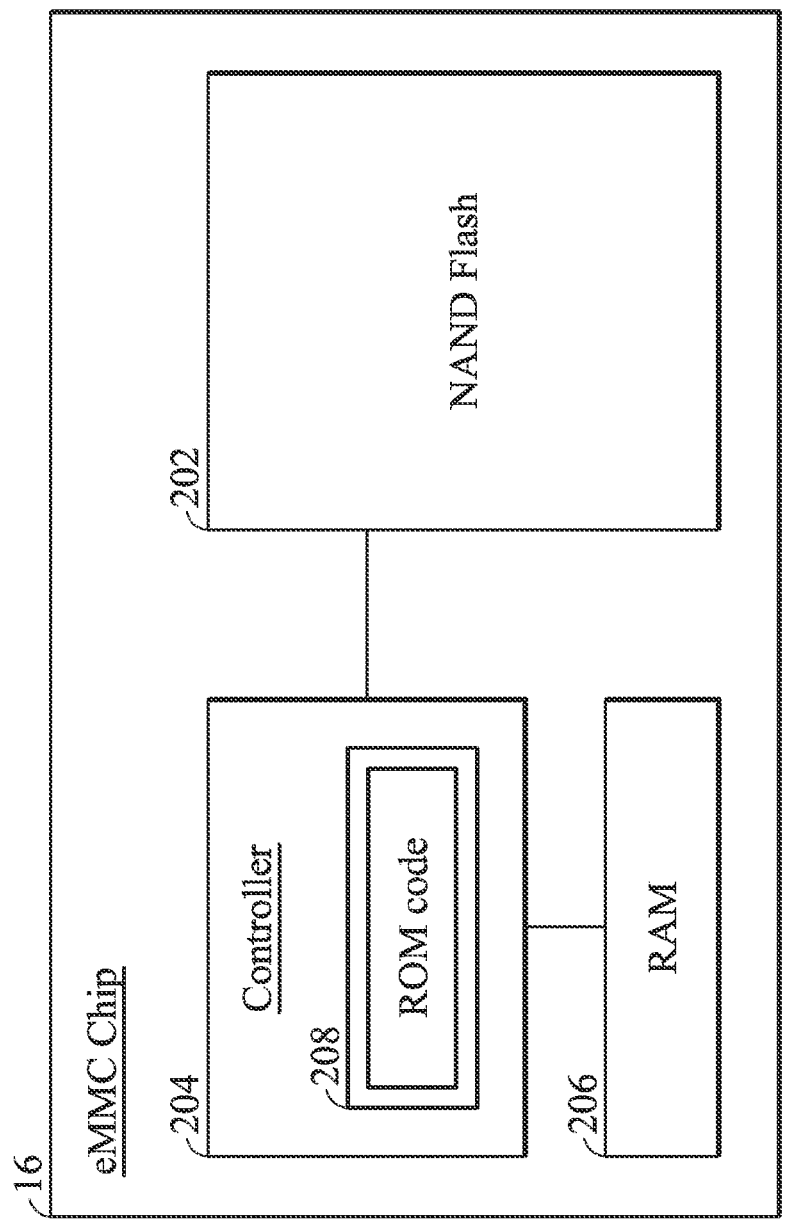
FIG. 2 shows a block diagram depicting the eMMC chip 16.

FIG. 2 shows a block diagram depicting the eMMC chip 16, which includes a NAND Flash 202, a controller 204 and a random access memory (RAM) 206. The controller 204 has a read only memory 208 stored with a ROM code. By executing the ROM code and using the random access memory as a temporary storage, the controller 204 controls the NAND Flash 202. In an exemplary embodiment, the ROM code is adapted to the eMMC design of FIG. 1. The controller 204 executing the ROM code determines a voltage level of the security protection enable/disable pin SP_Pin. When the security protection enable/disable pin SP_Pin is pulled low, the controller 204 enables a security protection of the eMMC 10; otherwise, the controller 204 disables the security protection. In an exemplary embodiment, the controller 204 enables the security protection by disabling a plurality of vendor commands which are designed for failure analysis. In this manner, no backdoor program can be installed onto the electronic device 100 to gain access to security data of the eMMC 10.

In an exemplary embodiment, the security protection enable/disable pin SP_Pin is implemented by a general purpose pin (e.g. a GPIO pin) of an eMMC chip, or, any reserved pin of an eMMC chip may be used as the security protection enable/disable pin SP_Pin.

In an exemplary embodiment, the security protection enable/disable solder ball SP_SB is implemented by one GND solder ball of the solder balls 14. In this manner, a conventional printed circuit board used in an electronic device is suitable for being soldered to the eMMC of the disclosure because the GND solder ball is always designed for coupling to ground. The disclosed eMMC has a convenient design.

In another exemplary embodiment, a solder ball reserved in a conventional eMMC ball package just for stress balancing without the transmission of any meaningful signal is used as the security protection enable/disable solder ball SP_SB of the disclosure.

Figure 3:
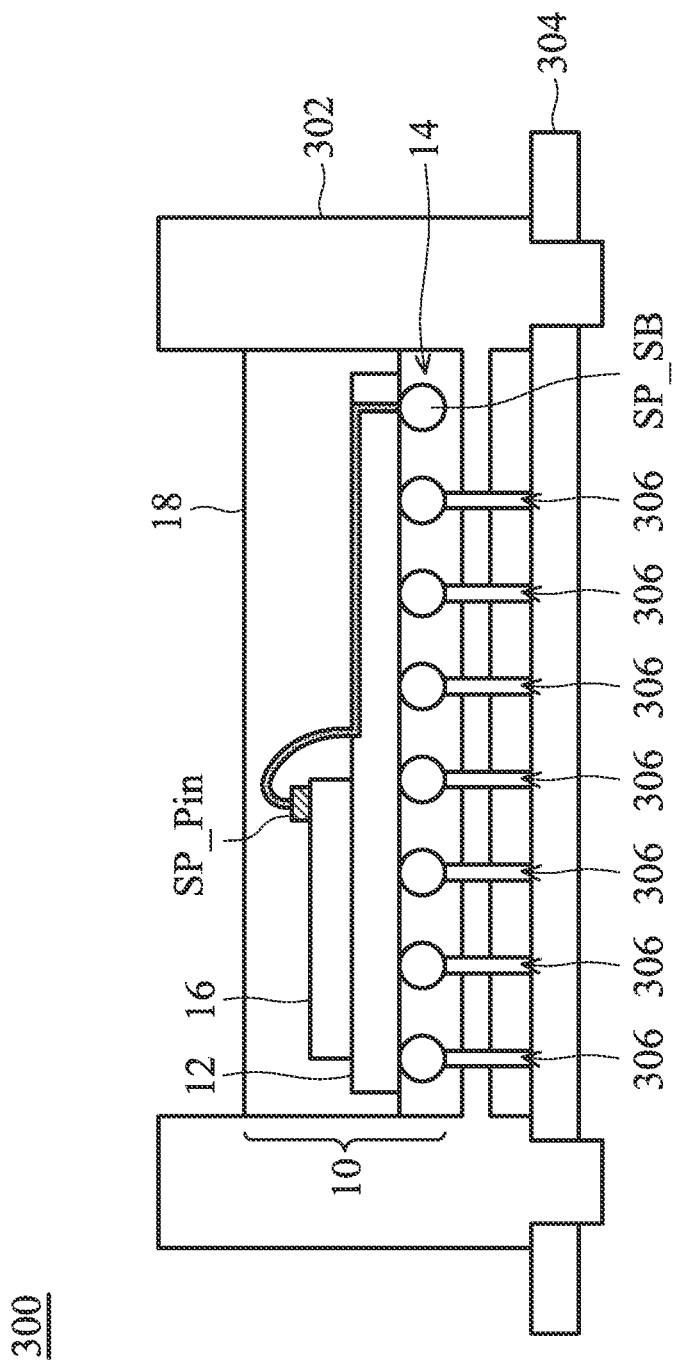
FIG. 3 depicts lateral view of an eMMC engineering board 300 for failure analysis of the eMMC 10.

FIG. 3 depicts a lateral view of an eMMC engineering board 300. The eMMC engineering board 300 is for failure analysis of the eMMC 10. The eMMC engineering board 300 comprises an eMMC socket 302 and a printed circuit board 304. The eMMC socket 302 is designed for insertion of the disclosed eMMC 10 and is mounted onto the printed circuit board 304. The printed circuit board 304 provides contact pads 306 to contact with just a portion of the solder balls 14 of the inserted eMMC 10 and leaves the security protection enable/disable solder ball SP_SB floating (no contact pad is provided for SP_SB). Thus, the security protection of the eMMC 10 inserted in the eMMC socket 302 is disabled such that failure analysis of the eMMC 10 is allowed. Vender commands for failure analysis may be enabled with the disabling of the security protection.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An embedded flash memory card, comprising:
an embedded flash memory card substrate plate and a plurality of solder balls, wherein the solder balls are soldered to the embedded flash memory card substrate plate, and, one of the solder balls is designed as a security protection enable and disable solder ball; and
an embedded flash memory card chip bound to the embedded flash memory card substrate plate, wherein the embedded flash memory card chip has a security protection enable and disable pin electrically connected to the security protection enable and disable solder ball and the security protection enable and disable pin is internally pulled high by the embedded flash memory card chip when the security protection enable and disable solder ball is floating,
wherein:
the security protection enable and disable solder ball is floating when the embedded flash memory card is mounted on an embedded flash memory card engineering board;
the security protection enable and disable solder ball is soldered to a ground line of a printed circuit board of an electronic device when the embedded flash memory card is mounted in the electronic device;
the embedded flash memory card chip further comprises a controller and, when the security protection enable and disable solder ball is coupled to ground, the controller disables a plurality of vendor commands to protect the embedded flash memory card from software-based attacks; and
the controller enables the plurality of vendor commands when the security protection enable and disable pin is pulled high.

2. The embedded flash memory card as claimed in claim 1, wherein the controller of the embedded flash memory card chip has a read only memory stored with a ROM code, and the controller executes the ROM code to determine a voltage level of the security protection enable and disable pin and, when the security protection enable and disable pin is pulled low, the controller executing the ROM code enables a security protection of the embedded flash memory card, otherwise, the controller disables the security protection.

3. The embedded flash memory card as claimed in claim 1, wherein the security protection enabled and disable pin is implemented by a general purpose pin of the embedded flash memory card chip.

4. The embedded flash memory card as claimed in claim 1, wherein the security protection enable and disable solder ball is implemented by one GND solder ball of the solder balls soldered to the embedded flash memory card substrate plate.

5. An electronic device, comprising:
an embedded flash memory card comprising:
an embedded flash memory card substrate plate and a plurality of solder balls, wherein the solder balls are soldered to the embedded flash memory card substrate plate, and, one of the solder balls is designed as a security protection enable and disable solder ball; and
an embedded flash memory card chip bound to the embedded flash memory card substrate plate, wherein the embedded flash memory card chip has a security protection enable and disable in electrically connected to the security protection enable and disable solder ball and the security protection enable and disable pin is internally pulled high by the embedded flash memory card chip when the security protection enable and disable solder ball is floating, wherein:
the security protection enable and disable solder ball is floating when the embedded flash memory card is mounted on an embedded flash memory card engineering board;
the security protection enable and disable solder ball is soldered to a ground line of a printed circuit board of an electronic device when the embedded flash memory card is mounted in the electronic device;
the embedded flash memory card chip further comprises a controller and, when the security protection enable and disable solder ball is coupled to ground, the controller disables a plurality of vendor commands to protect the embedded flash memory card from software-based attacks; and
the controller enables the plurality of vendor commands when the security protection enable and disable pin is pulled high; and
wherein the printed circuit board is soldered to the embedded flash memory card via the solder balls of the embedded flash memory card, and provides a ground line soldered to the security protection enable and disable solder ball of the embedded flash memory card.

6. An embedded flash memory card engineering board, comprising:
an embedded flash memory card socket having inserted therein, an embedded flash memory card, comprising:
an embedded flash memory card substrate plate and a plurality of solder balls, wherein the solder balls are soldered to the embedded flash memory card substrate plate, and, one of the solder balls is designed as a security protection enable and disable solder ball; and
an embedded flash memory card chip bound to the embedded flash memory card substrate plate, wherein the embedded flash memory card chip has a security protection enable and disable pin electrically connected to the security protection enable and disable solder ball and the security protection enable and disable pin is internally pulled high by the embedded flash memory card chip when the security protection enable and disable solder ball is floating,
wherein:
the security protection enable and disable solder ball is floating when the embedded flash memory card is mounted on an embedded flash memory card engineering board;
the security protection enable and disable solder ball is soldered to a ground line of a printed circuit board of an electronic device when the embedded flash memory card is mounted in the electronic device;
the embedded flash memory card chip further comprises a controller and, when the security protection enable and disable solder ball is coupled to ground, the controller disables a plurality of vendor commands to protect the embedded flash memory card from software-based attacks; and
the controller enables the plurality of vendor commands when the security protection enable and disable pin is pulled high; and
wherein the printed circuit board on which the embedded flash memory card socket is mounted provides contact pads to contact with solder balls, not including the security protection enable and disable solder ball, of the embedded flash memory card inserted in the embedded flash memory card socket, thereby to leave the security protection enable and disable solder ball of the embedded flash memory card floating to disable a security protection function of the embedded flash memory card.

* * * * *